(12) United States Patent
    Aki

(10) Patent No.: US 11,512,793 B2
(45) Date of Patent: Nov. 29, 2022

(54) REMOTE CONTROL DEVICE FOR SOLENOID VALVE

(71) Applicant: SMC CORPORATION, Chiyoda-ku (JP)

(72) Inventor: Tomohiko Aki, Nagareyama (JP)

(73) Assignee: SMC CORPORATION, Chiyoda-ku (JP)

( * ) Notice: Subject to any disclaimer, the term of this patent is extended or adjusted under 35 U.S.C. 154(b) by 312 days.

(21) Appl. No.: 16/825,154

(22) Filed: Mar. 20, 2020

(65) Prior Publication Data

US 2020/0309283 A1    Oct. 1, 2020

(30) Foreign Application Priority Data

Mar. 25, 2019    (JP) .............................. JP2019-056824

(51) Int. Cl.
    *G08C 17/02*    (2006.01)
    *F16K 31/06*    (2006.01)
    *G08C 19/16*    (2006.01)

(52) U.S. Cl.
    CPC .......... *F16K 31/0679* (2013.01); *G08C 17/02* (2013.01); *G08C 19/16* (2013.01); *G08C 2201/50* (2013.01)

(58) Field of Classification Search
    CPC .... G08C 17/02; G08C 19/16; G08C 2201/50; F16K 31/0603; H04W 4/008; H04L 67/12; H04B 5/0081
    See application file for complete search history.

(56) References Cited

U.S. PATENT DOCUMENTS

| 6,170,527 | B1 | 1/2001 | Hayashi et al. |
| 8,276,877 | B2 | 10/2012 | Cha et al. |
| 2014/0251467 | A1 | 9/2014 | Ogawa |
| 2015/0108380 | A1* | 4/2015 | Huang .................... F16K 31/06 251/129.04 |

(Continued)

FOREIGN PATENT DOCUMENTS

| CN | 1268637 A | 10/2000 |
| CN | 1740614 A | 3/2006 |

(Continued)

OTHER PUBLICATIONS

Japanese Office Action dated Jul. 7, 2020 in Japanese Patent Application No. 2019-056824 (with partial unedited computer generated English translation), 7 pages.

(Continued)

*Primary Examiner* — Vernal U Brown
(74) *Attorney, Agent, or Firm* — Oblon, McClelland, Maier & Neustadt, L.L.P.

(57) ABSTRACT

A remote control unit of a remote control device wirelessly transmits a first instruction signal or a second instruction signal instructing to operate a solenoid valve, to a solenoid valve control unit. The solenoid valve control unit receives the first instruction signal or the second instruction signal and generates a first drive signal or a second drive signal on the basis of the received first instruction signal or the received second instruction signal, respectively. The solenoid valve is of a double solenoid type, and includes a first solenoid to which the first drive signal is supplied and a second solenoid to which the second drive signal is supplied.

4 Claims, 3 Drawing Sheets

(56) References Cited

U.S. PATENT DOCUMENTS

2015/0184772 A1* 7/2015 Inagaki .................. F16K 31/14
                                                                                           251/30.01

FOREIGN PATENT DOCUMENTS

| CN | 201412563 Y | 2/2010 | | |
|---|---|---|---|---|
| CN | 102520680 A | 6/2012 | | |
| EP | 0045513 | * | 8/1981 | ............. B25J 19/00 |
| JP | 7-190234 A | 7/1995 | | |
| JP | 10-1124233 B1 | 3/2012 | | |
| JP | 2014-1846 A | 1/2014 | | |
| JP | 2014-169771 A | 9/2014 | | |
| JP | 2016-14648 A | 1/2016 | | |
| JP | 2017-179742 A | 10/2017 | | |
| JP | 2018-19043 A | 2/2018 | | |

OTHER PUBLICATIONS

Japanese Office Action dated Feb. 25, 2020 in Japanese Application No. 2019-056824 (with Partial English translation), 7 pages.
Combined Chinese Office Action and Search Report dated Oct. 11, 2021 in Patent Application No. 202010211473.1 (with partial English language translation), 9 pages.
Office Action dated Jul. 1, 2021 in corresponding Korean Patent Application No. 10-2020-0033576 (with English Translation), 11 pages.
Combined Taiwanese Office Action and Search Report dated Sep. 9, 2021 in Taiwanese Patent Application No. 109109635 (with English translation), 8 pages.

* cited by examiner

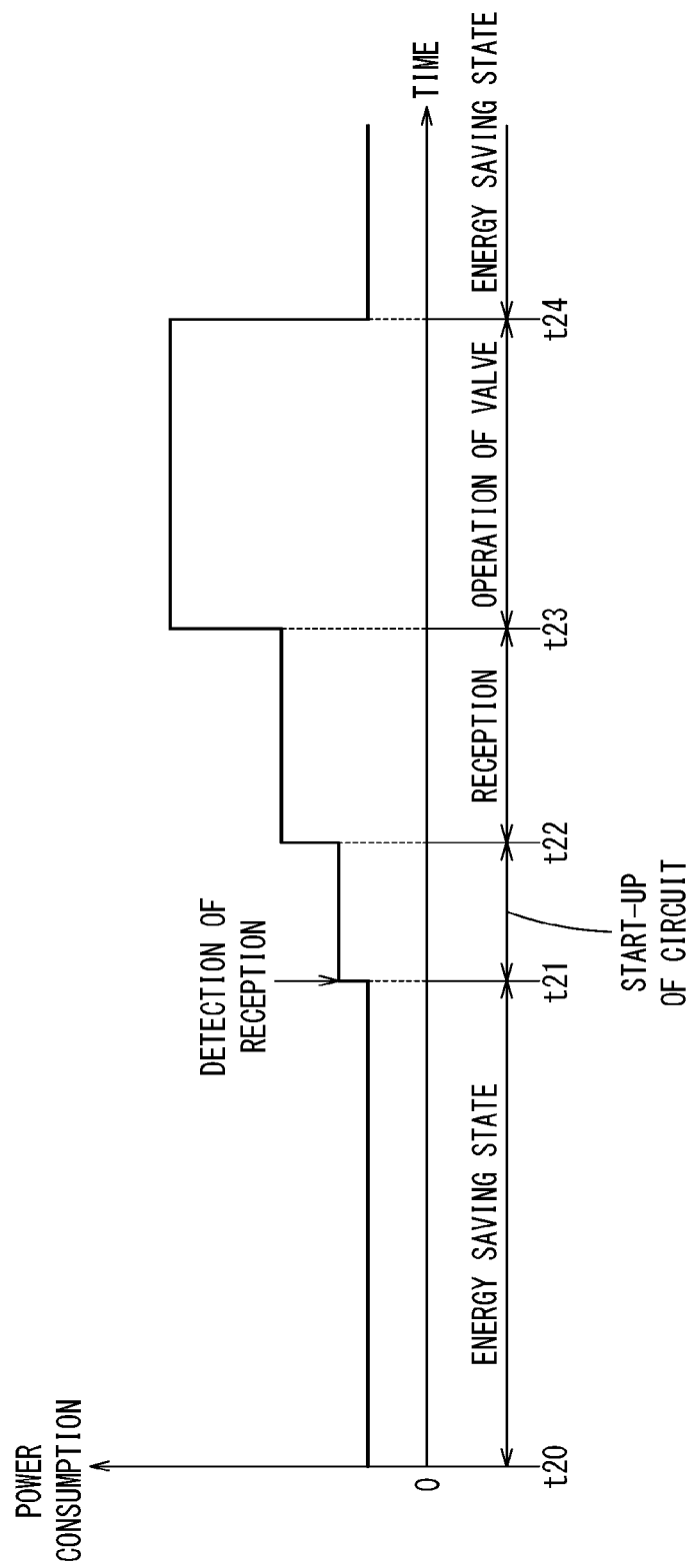

REMOTE CONTROL DEVICE FOR SOLENOID VALVE

CROSS-REFERENCE TO RELATED APPLICATIONS

This application is based upon and claims the benefit of priority from Japanese Patent Application No. 2019-056824 filed on Mar. 25, 2019, the contents all of which are incorporated herein by reference.

BACKGROUND OF THE INVENTION

Field of the Invention

The present invention relates to a remote control device for a solenoid valve, for remotely controlling the solenoid valve installed in an object to be controlled.

Description of the Related Art

In recent years, such a configuration has been adopted that a solenoid valve is installed in an object to be controlled, such as a rotating body or a movable body, and drive signals are supplied to the solenoid valve via wired or wireless connections to thereby operate the solenoid valve, whereby the operation of the object is controlled.

In the case of wired electrical connection, however, Cableveyor (registered trademark) systems protecting cables need to be installed, and the drive signals need to be supplied to the solenoid valves via slip rings. On the other hand, in the case of wireless electrical connection, equipment for wireless power supply or the like is required. Thus, supplying the drive signals via wired or wireless connections increases the cost.

In a system for remotely controlling a solenoid valve via a wireless connection, disclosed in Japanese Laid-Open Patent Publication No. 2016-014648, power is supplied to the solenoid valve from a battery.

SUMMARY OF THE INVENTION

Since the solenoid valve consumes relatively large power, the battery may run out when the drive signals are supplied to the solenoid valve via a wireless electrical connection to operate the solenoid valve for a long time. Moreover, the solenoid of the solenoid valve needs to be continuously energized by the battery while the solenoid valve is being operated, and thus it is impossible to keep the power consumption of the system low.

The present invention has been devised taking into consideration the aforementioned problems, and has the object of providing a remote control device for a solenoid valve capable of operating the remotely controlled solenoid valve for a long time while reducing electric power consumed by the solenoid valve.

A remote control device for a solenoid valve according to the present invention remotely controls the solenoid valve installed in an object to be controlled, and includes a remote control unit configured to wirelessly transmit an instruction signal instructing to operate the solenoid valve, and a solenoid valve control unit configured to be operated by electric power supplied by a battery and configured to receive the instruction signal and control operation of the solenoid valve based on the received instruction signal. In this case, it is preferable that the solenoid valve be of a double solenoid type.

In the solenoid valve of the double solenoid type, a valve element moves to a predetermined position when solenoids are energized, and is kept in the predetermined position even after the energization is stopped. In the present invention, since the valve element is kept at the predetermined position, it is not necessary to continuously energize the solenoids. Thus, in the present invention including the solenoid valve of the double solenoid type, power consumption by the remotely controlled solenoid valve can be reduced compared with solenoid valves of the single solenoid type requiring continuous solenoid energization.

Moreover, since the time required to energize the solenoid valve is reduced, energy consumed by the solenoid valve control unit controlling the solenoid valve can be reduced. As a result, the capacity of the battery driving the solenoid valve control unit lasts longer, enabling the solenoid valve to be operated for a long time.

Furthermore, since the solenoid valve is installed in the object to be controlled, the operation of the object to be controlled can be easily and quickly controlled using the solenoid valve.

Here, it is preferable that the remote control unit include an external input receiver section configured to receive a signal input from an external device and/or an operation section configured to be operated by a user, and that the remote control unit generate the instruction signal based on the signal input from the external device or operation on the operation section by the user and transmit the instruction signal to the solenoid valve control unit.

Thus, the remote control unit may at least operate only during a period from when the external input receiver section receives the signal input from the external device or from when the user operates the operation section until the instruction signal is generated and the transmission of the signal to the solenoid valve control unit is finished. This makes it possible to achieve electric power saving of the remote control unit.

Moreover, since the solenoid valve is of the double solenoid type, the solenoid valve includes a first solenoid and a second solenoid.

In this case, the remote control unit transmits to the solenoid valve control unit a first instruction signal in the form of pulse for instructing to energize the first solenoid and a second instruction signal in the form of pulse for instructing to energize the second solenoid.

In addition, the solenoid valve control unit is located adjacent to the object to be controlled and connected to the solenoid valve by wire. Upon receiving the first instruction signal, the solenoid valve control unit generates a first drive signal in the form of pulse based on the received first instruction signal and supplies the generated first drive signal to the first solenoid. On the other hand, upon receiving the second instruction signal, the solenoid valve control unit generates a second drive signal in the form of pulse based on the received second instruction signal and supplies the generated second drive signal to the second solenoid.

Consequently, the first solenoid is energized only while the first drive signal in the form of pulse is supplied, and the second solenoid is energized only while the second drive signal in the form of pulse is supplied. As a result, the solenoid valve can be operated with the bare minimum of energy supply, leading to a further reduction in the energy consumed by the solenoid valve. In addition, since the solenoid valve control unit is located adjacent to the object to be controlled and connected to the solenoid valve by wire, the operation of the solenoid valve can be reliably controlled.

Furthermore, it is preferable that the solenoid valve control unit start operating when starting receiving the instruction signal and that the solenoid valve control unit stop operating after the operation of the solenoid valve based on the instruction signal is finished. Thus, the solenoid valve control unit is put into sleep mode (energy saving mode) during a period when operation control of the solenoid valve is not performed. As a result, the solenoid valve can be operated for a longer time.

Yet moreover, the remote control unit and the solenoid valve control unit are configured to wirelessly communicate with each other in a bidirectional manner. In this case, the remote control unit wirelessly transmits at least the instruction signal to the solenoid valve control unit. In addition, the solenoid valve control unit wirelessly transmits at least a signal indicating a state of the solenoid valve control unit, to the remote control unit. Consequently, the function of monitoring the solenoid valve, for example, in the remote control device can be improved.

Moreover, it is preferable that at least one of the remote control unit and the solenoid valve control unit include a display section and that the display section display a state of the remote control unit and/or the state of the solenoid valve control unit. This allows the user to monitor the state of the remote control unit and/or the state of the solenoid valve control unit using the remote control unit or the solenoid valve control unit.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a timing chart indicating changes in electric power consumed by a solenoid valve control unit over time.

DESCRIPTION OF THE PREFERRED EMBODIMENT

A preferred embodiment of a remote control device for a solenoid valve according to the present invention will be described in detail below with reference to the accompanying drawings.

[Configuration of the Embodiment]

Figure 1:
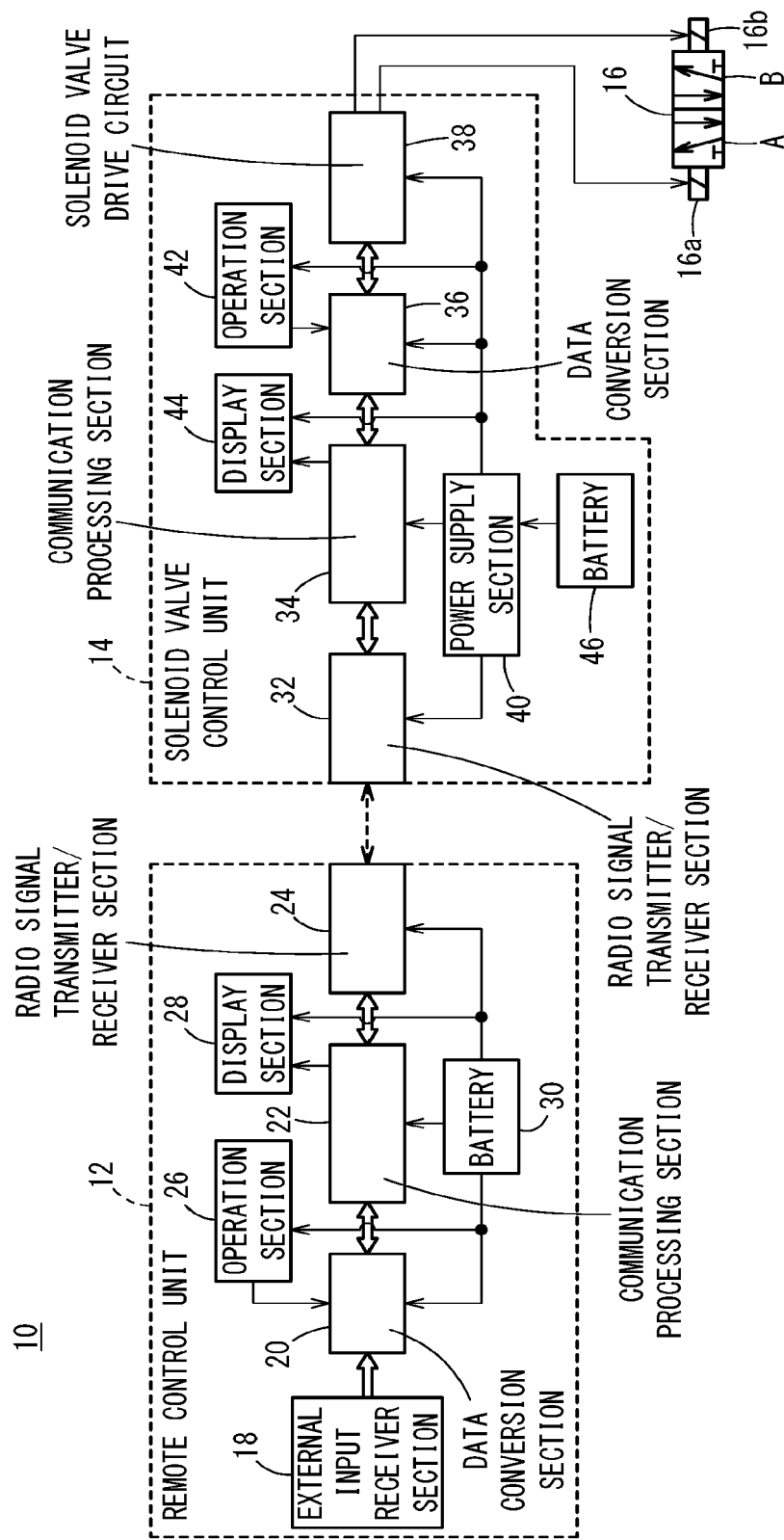
FIG. 1 is a block diagram of a remote control device according to an embodiment.

FIG. 1 is a block diagram of a remote control device 10 for a solenoid valve 16 according to an embodiment (hereinafter also referred to as "remote control device 10 according to the embodiment"). The remote control device 10 includes a remote control unit 12, a solenoid valve control unit 14, and the solenoid valve 16.

The remote control unit 12 functions as a remote controller (transmitter) allowing a user who is away from an object to be controlled (which will be hereinafter referred to as a controlled object) to remotely control the solenoid valve 16 installed in the controlled object. The remote control unit 12 and the solenoid valve control unit 14 can wirelessly communicate with each other in a bidirectional manner. The solenoid valve control unit 14 and the solenoid valve 16 are connected by wire.

In the embodiment, bidirectional wireless communication or wireless signal transmission/reception refers to communication (transmission/reception) by communication methods other than wired communications and includes wireless communication using radio waves, infrared communication, and other wireless manners. Moreover, the controlled object refers to an object in which the flow or pressure of fluid is controlled by operating the solenoid valve 16, and refers to, for example, an object such as a rotating body or a movable body in which fluid can flow.

The solenoid valve control unit 14 functions as a main unit (receiver) of the remote control device 10 controlling the operation of the solenoid valve 16 based pm instructions or commands wirelessly transmitted from the remote control unit 12. The solenoid valve 16 is of the double solenoid type including a first solenoid 16a and a second solenoid 16b.

The configurations of the remote control unit 12, the solenoid valve control unit 14, and the solenoid valve 16 will now be described in detail.

The remote control unit 12 includes an external input receiver section 18, a data conversion section 20, a communication processing section 22, a radio signal transmitter/receiver section 24, an operation section 26, a display section 28, and a battery 30.

The external input receiver section 18 receives input from an external device such as a PLC. In this case, for example, digital signals such as contact input or open drain are input from the external device to the external input receiver section 18, and the external input receiver section 18 outputs the input signals, to the data conversion section 20.

The operation section 26 is a user-operable input device such as buttons or switches provided for the remote control unit 12. The operation section 26 is provided with contacts or an internal microcomputer (both not illustrated). When a user operates the operation section 26, the operation section 26 outputs contact output corresponding to the content of the operation or logical information (1 or 0) from the internal microcomputer corresponding to the content of the operation to the data conversion section 20.

The data conversion section 20 converts the input from the external device output from the external input receiver section 18 or the information from the operation section 26 into data in a format that the communication processing section 22 can process. Specifically, in a case where the input from the external device or the information from the operation section 26 corresponds to instructions for operating the solenoid valve 16, the data conversion section 20 converts the content of the instruction into data for packet communication.

As described above, the solenoid valve 16 includes the first solenoid 16a and the second solenoid 16b. In a case where energization of the first solenoid 16a is instructed, the data conversion section 20 converts the input or the information into data corresponding to the content of the instruction (first instruction signal). On the other hand, in a case where energization of the second solenoid 16b is instructed, the data conversion section 20 converts the input or the information into data corresponding to the content of the instruction (second instruction signal).

The communication processing section 22 modulates the data converted by the data conversion section 20. In addition, the communication processing section 22 demodulates data received by the radio signal transmitter/receiver section 24.

The radio signal transmitter/receiver section 24 wirelessly transmits and receives signals to and from the solenoid valve control unit 14 (through packet communication). For example, the radio signal transmitter/receiver section 24 wirelessly transmits the data modulated by the communication processing section 22 to the solenoid valve control unit 14 in packets.

The display section 28 is a display means such as an LED and is turned on, based on the signal from the communication processing section 22 to inform the user that the remote control unit 12 including the communication processing section 22 is in operation. The battery 30 supplies electric power to the components of the remote control unit 12.

On the other hand, the solenoid valve control unit 14 includes a radio signal transmitter/receiver section 32, a communication processing section 34, a data conversion section 36, a solenoid valve drive circuit 38, a power supply section 40, an operation section 42, a display section 44, and a battery 46.

The radio signal transmitter/receiver section 32 wirelessly transmits and receives signals to and from the radio signal transmitter/receiver section 24 of the remote control unit 12 (through packet communication). For example, the radio signal transmitter/receiver section 32 receives the first instruction signal or the second instruction signal wirelessly transmitted in packets from the radio signal transmitter/receiver section 24.

The communication processing section 34 demodulates the data (the first instruction signal or the second instruction signal) received by the radio signal transmitter/receiver section 32 and outputs the demodulated data to the data conversion section 36. In addition, the communication processing section 34 modulates the data converted by the data conversion section 36 and outputs the data to the radio signal transmitter/receiver section 32.

The data conversion section 36 converts the demodulated first instruction signal or the demodulated second instruction signal into a signal in a format that the solenoid valve drive circuit 38 can process, and outputs the converted first instruction signal or the converted second instruction signal to the solenoid valve drive circuit 38.

The operation section 42 has a configuration similar to that of the operation section 26 and outputs contact output corresponding to the content of the operation by the user or logical information (1 or 0) from the internal microcomputer corresponding to the content of the operation to the data conversion section 36. Thus, the data conversion section 36 can convert the signal from the operation section 42 into data for packet communication and output the converted data to the communication processing section 34.

The solenoid valve drive circuit 38 generates a first drive signal or a second drive signal for operating the solenoid valve 16 on the basis of the first instruction signal or the second instruction signal, respectively.

In this case, when the first drive signal is supplied from the solenoid valve drive circuit 38 to the first solenoid 16*a*, the first solenoid 16*a* is energized, and a valve element of the solenoid valve 16 moves from an initial position to a first predetermined position under the excitation effect of the first solenoid 16*a*. That is, fluid paths inside the solenoid valve 16 transition to a state indicated by reference symbol "A" in FIG. 1. The valve element is kept in the first predetermined position (state of A) even after the supply of the first drive signal is stopped.

On the other hand, when the second drive signal is supplied from the solenoid valve drive circuit 38 to the second solenoid 16*b*, the second solenoid 16*b* is energized, and the valve element moves to a second predetermined position under the excitation effect of the second solenoid 16*b*. That is, the fluid paths inside the solenoid valve 16 transition to a state indicated by reference symbol "B" (initial position) in FIG. 1. The valve element is kept in the second predetermined position (state of B) even after the supply of the second drive signal is stopped.

The power supply section 40 is a booster circuit or a DC to DC converter. The power supply section 40 performs a predetermined voltage conversion on the voltage of the battery 46 and supplies the converted voltage to the components of the solenoid valve control unit 14. Note that the solenoid valve drive circuit 38 consumes more electric power than the other components inside the solenoid valve control unit 14 to energize the first solenoid 16*a* or the second solenoid 16*b*. In this case, the power supply section 40 increases the voltage of the battery 46 to a level higher than the voltages supplied to the other components inside the solenoid valve control unit 14, and supplies the increased voltage to the solenoid valve drive circuit 38. Thus, more power is supplied to the solenoid valve drive circuit 38 than to the other components.

The display section 44 is a display means such as an LED as is the display section 28, and is turned on, based on the signal output from the communication processing section 34 to inform the user that the solenoid valve control unit 14 including the communication processing section 34 is in operation.

[Operation of the Embodiment]

The remote control device 10 according to the embodiment is configured as above. Next, the operation of the remote control device 10 will be described with reference to FIGS. 2 and 3. In the description of the operation, FIG. 1 will also be referred as required.

Figure 2:
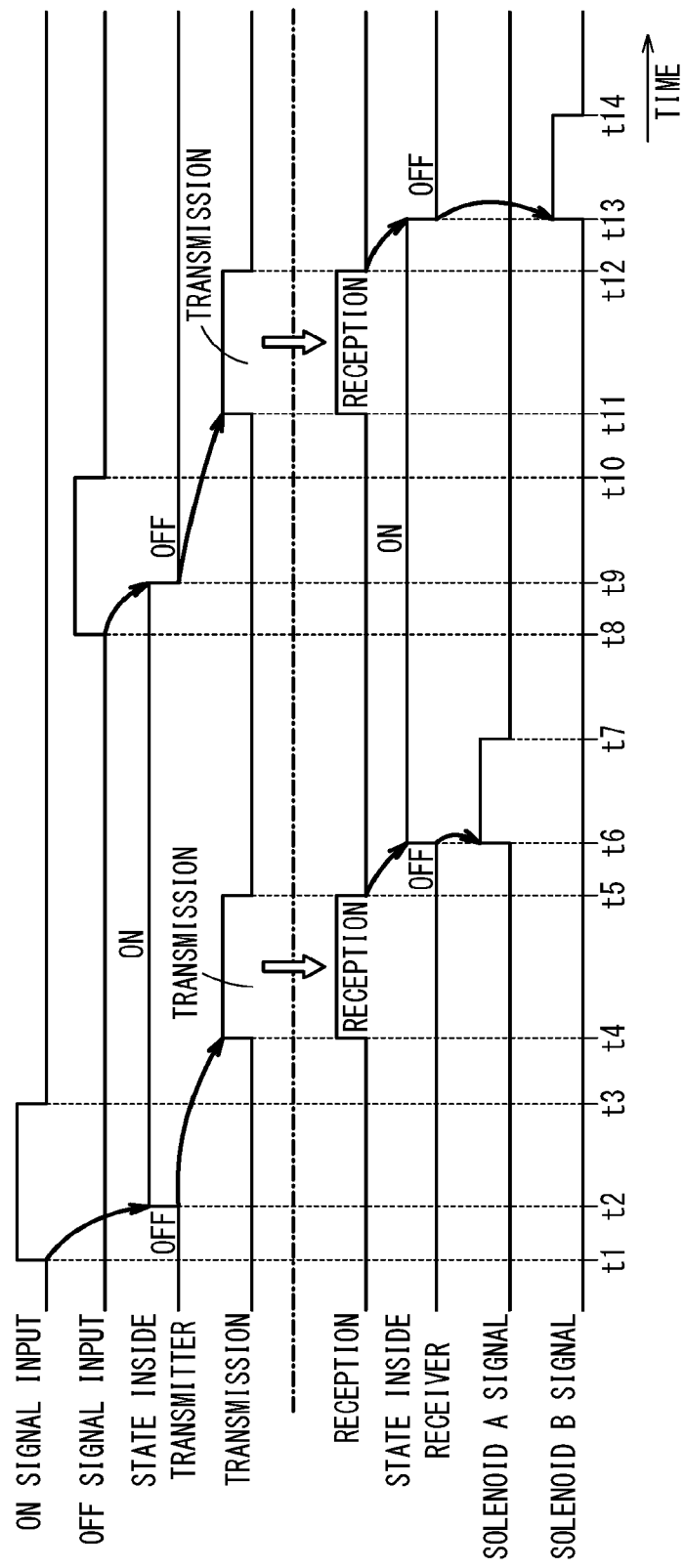
FIG. 2 is a timing chart illustrating the operation of the remote control device in FIG. 1.

FIG. 2 is a timing chart illustrating the overall operation of the remote control device 10. In the description below, the external input receiver section 18 receives an input from an external device or a user operates the operation section 26 while the solenoid valve 16 is in a closed state (state of B in FIG. 1). In response to this, the first solenoid 16*a* is energized, and the solenoid valve 16 is brought into an open state (state of A). Subsequently, the second solenoid 16*b* is energized, and the solenoid valve 16 returns to the closed state.

First, at time t1, the external input receiver section 18 receives a signal input from an external device or a user starts operating the operation section 26. In this case, it is assumed that the input from the external device or the content of the operation on the operation section 26 instructs to energize the first solenoid 16*a* to switch the solenoid valve 16 from the closed state to the open state (ON signal input). The signal indicating the content of the instruction is input to the data conversion section 20.

At time t2, the data conversion section 20 converts the input signal into data in a format that the communication processing section 22 can process (first instruction signal in the form of pulse for packet communication).

The communication processing section 22 modulates the first instruction signal converted by the data conversion section 20 and outputs the modulated first instruction signal to the radio signal transmitter/receiver section 24. For example, in a case where the first instruction signal is transmitted by radio waves, the first instruction signal is modulated by superimposing a carrier wave at a predetermined frequency on the first instruction signal, and, in addition, by using a spread spectrum technology such as frequency hopping. In a case where the first instruction signal is transmitted through infrared communication, the first instruction signal is modulated by performing pulse width modulation on the first instruction signal, and, in addition, by superimposing a carrier wave at a frequency that is less sensitive to natural light.

Moreover, the communication processing section 22 starts turning on the display section 28 after the modulation of the first instruction signal starts. By visually checking that the display section 28 is turned on, the user can recognize that the remote control unit 12 has started operating, based on the external input or the operation on the operation section 26.

The "state inside transmitter" in FIG. 2 indicates a state, i.e., the open state (ON) or the closed state (OFF), into which the solenoid valve 16 is brought under the control by the remote control unit 12 serving as a transmitter. Thus, the switch from OFF to ON at time t2 indicates that the state inside (the communication processing section 22 of) the remote control unit 12 transitions from a mode to keep the solenoid valve 16 in the closed state to a mode to switch the solenoid valve 16 to the open state.

In this manner, in the remote control unit 12, the mode is switched when the communication processing section 22 starts the modulation process. In FIG. 2, the input of the content of the instruction to the data conversion section 20 continues until time t3.

During a period between time t4 and time t5, the radio signal transmitter/receiver section 24 wirelessly transmits the modulated first instruction signal in packets to the solenoid valve control unit 14. Thus, the radio signal transmitter/receiver section 32 of the solenoid valve control unit 14 can receive the first instruction signal during the above period.

The communication processing section 22 may turn off the display section 28 after the radio signal transmitter/receiver section 24 completes or finishes the packet transmission of the first instruction signal. By visually checking that the display section 28 is turned off, the user can recognize that the remote control unit 12 has completed the packet transmission of the first instruction signal to the solenoid valve control unit 14.

At time t6, the communication processing section 34 demodulates the received first instruction signal. In this case, the communication processing section 34 can recognize that the first instruction signal, instructing to switch the solenoid valve 16 from the closed state to the open state, is received by detecting the carrier wave superimposed on the first instruction signal during the demodulation of the first instruction signal.

Then, the communication processing section 34 starts turning on the display section 44 and outputs the demodulated first instruction signal to the data conversion section 36. By visually checking that the display section 44 is turned on, the user can recognize that the solenoid valve control unit 14 has started operating, based on the reception of the first instruction signal.

The "state inside receiver" in FIG. 2 indicates a state, i.e., the open state (ON) or the closed state (OFF), into which the solenoid valve 16 is brought under the control by the solenoid valve control unit 14 serving as a receiver. Thus, the switch from OFF to ON at time t6 indicates that the state inside (the communication processing section 34 of) the solenoid valve control unit 14 transitions from the mode to keep the solenoid valve 16 in the closed state to the mode to switch the solenoid valve 16 to the open state. In this manner, in the solenoid valve control unit 14, the mode is switched when the communication processing section 34 starts the demodulation process.

The data conversion section 36 converts the input first instruction signal into data in a format that the solenoid valve drive circuit 38 can process. The solenoid valve drive circuit 38 generates a first drive signal in the form of pulse (solenoid A signal in FIG. 2) on the basis of the input first instruction signal and supplies the generated first drive signal to the first solenoid 16a. As a result, during a period between time t6 and time t7, the first solenoid 16a is energized, and the valve element of the solenoid valve 16 is displaced from the initial position to the first predetermined position (state of A in FIG. 1) under the excitation effect of the first solenoid 16a. In this case, the valve element is kept in the first predetermined position even after the supply of the first drive signal to the first solenoid 16a is stopped at time t7. As a result, fluid can be supplied to the controlled object from a fluid supply source (not illustrated) via the solenoid valve 16 or can be discharged from the controlled object to outside via the solenoid valve 16.

The communication processing section 34 may turn off the display section 44 after the solenoid valve drive circuit 38 stops supplying the first drive signal to the first solenoid 16a. By visually checking that the display section 44 is turned off, the user can recognize that the energization of the first solenoid 16a is stopped.

Next, at time t8, the external input receiver section 18 receives from the external device an input that instructs to energize the second solenoid 16b to switch the solenoid valve 16 from the open state to the closed state (OFF signal input). Alternatively, the user operates the operation section 26 to instruct to input the OFF signal.

As a result of this, at time t9, the data conversion section 20 converts the content of the input instruction into data in a format that the communication processing section 22 can process (second instruction signal in the form of pulse for packet communication).

As in the case of the first instruction signal, the communication processing section 22 modulates the second instruction signal converted by the data conversion section 20 and outputs the modulated second instruction signal to the radio signal transmitter/receiver section 24. Moreover, the communication processing section 22 starts turning on the display section 28 after the modulation of the second instruction signal is started, thereby allowing the user to recognize that the remote control unit 12 starts operating according to the external input or the operation on the operation section 26.

In this case, at time t9, the "state inside transmitter" switches from ON to OFF. That is, at time t9, the state inside the remote control unit 12 transitions from the mode to keep the solenoid valve 16 in the open state to the mode to switch the solenoid valve 16 to the closed state. In FIG. 2, the input of the content of the instruction to the data conversion section 20 continues until time t10.

During a period between time t11 and time t12, the radio signal transmitter/receiver section 24 wirelessly transmits the modulated second instruction signal in packets to the solenoid valve control unit 14. Thus, the radio signal transmitter/receiver section 32 of the solenoid valve control unit 14 can receive the second instruction signal during the above period.

The communication processing section 22 may turn off the display section 28 after the radio signal transmitter/receiver section 24 completes the transmission of the second instruction signal. By visually checking that the display section 28 is turned off, the user can recognize that the remote control unit 12 has completed the transmission of the second instruction signal to the solenoid valve control unit 14.

At time t13, the communication processing section 34 demodulates the received second instruction signal. In this case, the communication processing section 34 can recognize that the second instruction signal, instructing to switch the valve element of the solenoid valve 16 from the open state to the closed state, is received by detecting the carrier wave superimposed on the second instruction signal during the demodulation of the second instruction signal.

Then, the communication processing section 34 starts turning on the display section 44 and outputs the demodulated second instruction signal to the data conversion section 36. By visually checking that the display section 44 is turned on, the user can recognize that the solenoid valve control unit 14 is operating, based on the reception of the second instruction signal.

In this case, at time t13, the "state inside receiver" switches from ON to OFF. That is, the state inside the solenoid valve control unit 14 transitions from the mode to keep the solenoid valve 16 in the open state to the mode to switch the solenoid valve 16 to the closed state at time t13.

The data conversion section 36 converts the input second instruction signal into data in a format that the solenoid valve drive circuit 38 can process. The solenoid valve drive circuit 38 generates a second drive signal in the form of pulse (solenoid B signal in FIG. 2) on the basis of the input second instruction signal and supplies the generated second drive signal to the second solenoid 16b. As a result, during a period between time t13 and time t14, the second solenoid 16b is energized, and the valve element of the solenoid valve 16 is displaced from the first predetermined position (state of A in FIG. 1) to the second predetermined position (state of B serving as the initial position) under the excitation effect of the second solenoid 16b. In this case, the valve element is kept in the second predetermined position even after the supply of the second drive signal to the second solenoid 16b is stopped at time t14. As a result, fluid can be discharged from the controlled object to outside via the solenoid valve 16 or can be supplied to the controlled object from the fluid supply source via the solenoid valve 16.

The communication processing section 34 may turn off the display section 44 after the solenoid valve drive circuit 38 completes the supply of the second drive signal to the second solenoid 16b. By visually checking that the display section 44 is turned off, the user can recognize that the energization of the second solenoid 16b is stopped.

Next, electric power saving control by the solenoid valve control unit 14 will be described with reference to FIG. 3.

The solenoid valve control unit 14 is placed into energy saving mode (sleep mode) during a period between time t20 and time t21. In energy saving mode, the power supply section 40 of the solenoid valve control unit 14 converts the voltage of the battery 46 and supplies electric power to the operation section 42, while supplying the radio signal transmitter/receiver section 32 with small electric power at a level sufficient to detect the wireless signal from the remote control unit 12.

When the radio signal transmitter/receiver section 32 starts receiving the first instruction signal or the second instruction signal at time t21, the solenoid valve control unit 14 cancels energy saving mode, and the power supply section 40 supplies the radio signal transmitter/receiver section 32 with electric power at a level sufficient to receive the first instruction signal or the second instruction signal. This enables the radio signal transmitter/receiver section 32 to receive the first instruction signal or the second instruction signal transmitted in packets by the remote control unit 12.

When the reception of the first instruction signal or the second instruction signal is finished at time t22, the power supply section 40 starts supplying electric power to the communication processing section 34, the data conversion section 36, and the display section 44. This enables demodulation at the communication processing section 34, data conversion at the data conversion section 36, and lighting of the display section 44.

When the data conversion section 36 completes the conversion of the first instruction signal or the second instruction signal at time t23, the power supply section 40 starts supplying power to the solenoid valve drive circuit 38. This enables the solenoid valve drive circuit 38 to generate the first drive signal corresponding to the first instruction signal or the second drive signal corresponding to the second instruction signal and to supply the generated signal to the first solenoid 16a or the second solenoid 16b during a period between time t23 and time t24.

Subsequently, when the energization of the first solenoid 16a or the second solenoid 16b is finished at time t24, the power supply section 40 switches the entire solenoid valve control unit 14 to energy saving mode and supplies power only to the operation section 42 and the radio signal transmitter/receiver section 32.

In this manner, the solenoid valve control unit 14 is set to energy saving mode during the period between time t20 and time t21 and during the period after time t24, that is, while no process based on the first instruction signal or the second instruction signal is performed. This enables the power consumption to be kept at a low level. On the other hand, during the period between time t21 and time t24, the power consumption of the entire solenoid valve control unit 14 increases in a stepped manner depending on the operations of the components inside the solenoid valve control unit 14 based on the first instruction signal or the second instruction signal.

Electric power saving of the solenoid valve control unit 14 has been described with reference to FIG. 3. The operation described with reference to FIG. 3 can also be applied to the remote control unit 12. In this case, for example, a power supply section having a configuration identical to that of the power supply section 40 is disposed on the output side of the battery 30 in the remote control unit 12 in FIG. 1 so that the remote control unit 12 can be switched to energy saving mode during periods other than the period between time t1 and time t5 in FIG. 2, associated with transmission of the first instruction signal, and the period between time t8 and time t12, associated with transmission of the second instruction signal.

In addition, as described above, the radio signal transmitter/receiver sections 24 and 32 can wirelessly communicate with each other in a bidirectional manner (packet communication). Thus, in addition to the first instruction signal or the second instruction signal, the radio signal transmitter/receiver section 24 of the remote control unit 12 can transmit a signal indicating the operating state of the remote control unit 12 (signal supplied from the communication processing section 22 to the display section 28) in packets to the radio signal transmitter/receiver section 32 of the solenoid valve control unit 14. As a result, the communication processing section 34 can demodulate the signal received by the radio signal transmitter/receiver section 32 and output the demodulated signal to the display section 44 to turn on the display section 44.

On the other hand, the radio signal transmitter/receiver section 32 of the solenoid valve control unit 14 can transmit a signal indicating the operating state of the solenoid valve control unit 14 (signal supplied from the communication processing section 34 to the display section 44) in packets to the radio signal transmitter/receiver section 24 of the remote control unit 12. As a result, the communication processing section 22 can demodulate the signal received by the radio signal transmitter/receiver section 24 and output the demodulated signal to the display section 28 to turn on the display section 28.

[Effects of the Embodiment]

As described above, the remote control device 10 according to the embodiment uses the solenoid valve 16 of the double solenoid type. In the solenoid valve 16 of the double solenoid type, the valve element moves to the predetermined positions when the first solenoid 16a or the second solenoid 16b is energized, and is kept in the predetermined positions even after the energization is stopped. In the present embodiment, since the valve element is thus kept in the predetermined positions, it is not necessary to keep energization to the first solenoid 16a or the second solenoid 16b. Thus, in the embodiment using the solenoid valve 16 of the double solenoid type, energy consumed by the remotely controlled solenoid valve 16 can be reduced compared with solenoid valves of the single solenoid type requiring continuous solenoid energization.

Moreover, since the time required to energize the solenoid valve 16 is reduced, energy consumed by the solenoid valve control unit 14 controlling the solenoid valve 16 can be reduced. As a result, the capacity of the battery 46 operating the solenoid valve control unit 14 lasts longer, enabling the solenoid valve 16 to be operated for a long time.

Furthermore, since the solenoid valve 16 is installed in the controlled object, the operation of the controlled object can be easily and quickly controlled using the solenoid valve 16.

In addition, the remote control unit 12 may at least operate only during the period from when the external input receiver section 18 receives a signal input from the external device or from when the user operates the operation section 26 until the first instruction signal or the second instruction signal is generated and the transmission of the signal to the solenoid valve control unit 14 is finished. This makes it possible to achieve electric power saving of the remote control unit 12.

Moreover, the first solenoid 16a is energized only while the first drive signal in the form of pulse is supplied. On the other hand, the second solenoid 16b is energized only while the second drive signal in the form of pulse is supplied. As a result, the solenoid valve 16 can be operated with the bare minimum of energy supply, leading to a further reduction in the energy consumed by the solenoid valve 16. In addition, since the solenoid valve control unit 14 is located adjacent to the object to be controlled and connected to the solenoid valve 16 by wire, the operation of the solenoid valve 16 can be reliably controlled.

Furthermore, the solenoid valve control unit 14 starts operating when starting receiving the first instruction signal or the second instruction signal, and stops operating after the operation of the solenoid valve 16 based on the first instruction signal or the second instruction signal is finished. Thus, the solenoid valve control unit 14 is put into energy saving mode (sleep mode) during the period when the operation control of the solenoid valve 16 is not performed. As a result, the solenoid valve 16 can be operated for a longer time.

Yet moreover, the remote control unit 12 and the solenoid valve control unit 14 can wirelessly communicate with each other in a bidirectional manner. Thus, the remote control unit 12 can wirelessly transmit at least the first instruction signal or the second instruction signal to the solenoid valve control unit 14, and the solenoid valve control unit 14 can wirelessly transmit at least the signal indicating the operating state of the solenoid valve control unit 14 to the remote control unit 12. Consequently, the function of monitoring the solenoid valve 16, for example, of the remote control device 10 can be improved.

Moreover, the remote control unit 12 is provided with the display section 28, and the solenoid valve control unit 14 is provided with the display section 44. Thus, the display section 28 can display the operating state (operating state information) of the remote control unit 12, and the display section 44 can display the operating state (operating state information) of the solenoid valve control unit 14. Furthermore, since the remote control unit 12 and the solenoid valve control unit 14 can wirelessly communicate with each other in a bidirectional manner as described above, the operating state of one of the components (the remote control unit 12 or the solenoid valve control unit 14) can be monitored using the display section 28 or 44 of the other component by transmitting the signal indicating the operating state of the one of the components.

The present invention is not limited in particular to the embodiment described above, and may have various configurations without departing from the scope of the present invention as a matter of course.

What is claimed is:

1. A remote control device for a solenoid valve installed in an object to be controlled, for remotely controlling the solenoid valve, comprising:

a remote control unit configured to wirelessly transmit an instruction signal instructing to operate the solenoid valve; and a solenoid valve control unit configured to be operated by electric power supplied by a battery and configured to receive the instruction signal and control operation of the solenoid valve based on the received instruction signal;

wherein the solenoid valve is of a double solenoid type wherein the remote control unit includes a first display section for displaying that the remote control unit is in operation during a period from start to completion of processing of transmitting the instruction signal, wherein the solenoid valve control unit includes:

a radio signal transmitter/receiver section configured to receive the instruction signal;

a solenoid valve drive circuit configured to control the operation of the solenoid valve based on the instruction signal;

a second display section; and a power supply section configured to supply electric power supplied by the battery to the radio signal transmitter/receiver section, the solenoid valve drive circuit and the second display section, wherein the second display section displays that the solenoid valve control unit is in operation during a period beginning from when processing of the received instruction signal by the radio signal transmitter/receiver section is completed and continuing until when control of the operation of the solenoid valve by the solenoid valve drive circuit is completed, and wherein the power supply section supplies electric power to the radio signal transmitter/receiver section while the instruction signal is received by the radio signal transmitter/receiver section; and wherein the power supply section supplies electric power to the solenoid valve drive circuit and the second display section during a period beginning from when the processing of the received instruction signal is completed and continuing until when the control of the operation of the solenoid valve is completed.

2. The remote control device for the solenoid valve according to claim 1, wherein the remote control unit includes an external input receiver section configured to receive a signal input from an external device and/or an operation section configured to be operated by a user, and the remote control unit generates the instruction signal based on the signal input from the external device or operation on the operation section by the user and transmits the instruction signal to the solenoid valve control unit.

3. The remote control device for the solenoid valve according to claim 1;
wherein the solenoid valve includes a first solenoid and a second solenoid;
wherein the remote control unit transmits to the solenoid valve control unit a first instruction signal in a form of pulse for instructing to energize the first solenoid and a second instruction signal in a form of pulse for instructing to energize the second solenoid; and
wherein the solenoid valve control unit:
is located adjacent to the object to be controlled and connected to the solenoid valve by wire;
upon receiving the first instruction signal, generates a first drive signal in a form of pulse based on the received first instruction signal and supplies the generated first drive signal to the first solenoid; and
upon receiving the second instruction signal, generates a second drive signal in a form of pulse based on the received second instruction signal and supplies the generated second drive signal to the second solenoid.

4. The remote control device for the solenoid valve according to claim 1, wherein:
the remote control unit and the solenoid valve control unit are configured to wirelessly communicate with each other in a bidirectional manner;
the remote control unit wirelessly transmits at least the instruction signal to the solenoid valve control unit; and
the solenoid valve control unit wirelessly transmits at least a signal indicating a state of the solenoid valve control unit, to the remote control unit.

\* \* \* \* \*